United States Patent [19]

Mizutani et al.

[11] Patent Number: 4,843,477
[45] Date of Patent: Jun. 27, 1989

[54] VEHICLE TELEVISION HOUSING SYSTEM

[75] Inventors: Junichi Mizutani; Ryoichi Muroi; Chikahisa Hayashi; Yoshio Sano, all of Aichi; Moriyuki Komatsu, Osaka, all of Japan

[73] Assignees: Toyoda Gosei Co., Ltd., Nishikasugai; Matsushita Electric Industrial Co., Ltd., Kadoma, both of Japan

[21] Appl. No.: 125,367

[22] Filed: Nov. 25, 1987

[30] Foreign Application Priority Data

Nov. 25, 1986 [JP] Japan .................................... 280490

[51] Int. Cl.⁴ ..................... H04N 5/64; H04N 5/655
[52] U.S. Cl. ................................. 358/248; 312/7.2; 358/254; 358/229; 455/347; 455/348; 361/391
[58] Field of Search ............... 358/254, 248, 229; 312/7.2; 455/347, 348; 361/391; 70/57, 58; 292/144

[56] References Cited

U.S. PATENT DOCUMENTS

| | | | |
|---|---|---|---|
| 4,002,956 | 1/1977 | Minor | 361/194 |
| 4,066,307 | 1/1978 | Barding | 70/58 |
| 4,646,158 | 2/1987 | Ohno et al. | 358/254 |
| 4,647,980 | 3/1987 | Steventon et al. | 358/254 |
| 4,652,932 | 3/1987 | Miyajima | 358/254 |
| 4,756,175 | 4/1988 | Matsushima | 70/57 |
| 4,758,817 | 4/1988 | Akiyama | 455/348 |

FOREIGN PATENT DOCUMENTS 1209317  9/1959  France ............................ 455/346

OTHER PUBLICATIONS

U.S.A. Today, Comforts of Home Go Up in the Air, 8-16-86, p. 2B.

Primary Examiner—James J. Groody
Assistant Examiner—Jerome Grant
Attorney, Agent, or Firm—Cushman, Darby & Cushman

[57] ABSTRACT

A vehicle television receiver system comprises a television receiver be easily attached to and detached from the vehicle, engagement means attached to the vehicle and arranged to be actuated to make the television receiver be in an engaged condition when the television receiver is housed in a specific place of the vehicle and release means for making the engagement means and the television receiver be in a released condition when the release means is operated.

3 Claims, 5 Drawing Sheets

4,843,477

VEHICLE TELEVISION HOUSING SYSTEM

BACKGROUND OF THE INVENTION

1. Field of the Invention

The present invention relates to a vehicle television receiver system which can be housed in a rear portion of a seat, a console, a dashboard or the like, to make attachment/detachment of the television receiver by one-touch operation possible.

2. Prior Art

Heretofore, various types of television receivers, such as those designed to agree with a vehicle and installed in the vehicle in the process of producing the vehicle, those attached to the vehicle by after-working, and the like, have been used.

In general, it is necessary for the television receivers that television electromagnetic wave is guided from the outside of the vehicle. However, the television receivers attached to the vehicles by after-working have the disadvantage of bad appearance in the inside of the vehicle, because the treatment of feeder for guiding the television electromagnetic wave is exposed.

On the other hand, the television receivers designed to agree with the vehicles have the disadvantage in that the detachment thereof is so difficult that they cannot be taken out of the vehicles.

SUMMARY OF THE INVENTION

It is therefore an object of the present invention to eliminate the aforementioned disadvantages in the prior art. It is another object of the present invention to provide a vehicle television receiver system in which the television receiver can be easily attached to and detached from the vehicle. The vehicle television receiver system according to the present invention comprises engagement or locking means provided at the vehicle side and/or at the television receiver side, and release means for releasing or unlocking the actuated or locked condition of the engagement means.

In the vehicle television receiver system according to the present invention, the engagement means attached to a vehicle is actuated automatically to make a television receiver be in an engaged or locked condition when the television receiver is housed or installed in a specific place of the vehicle, and when the release means is operated, the engagement means and the television receiver are made to be in a released or unlocked condition. Accordingly, the attachment/detachment of the television receiver can be performed by one-touch operation.

BRIEF DESCRIPTION OF THE DRAWINGS

Above and other objects, features and advantages of the present invention will appear more fully from the following description in conjunction with the accompanying drawings, in which.

DETAILED DESCRIPTION OF THE PREFERRED EMBODIMENTS

Figure 1:
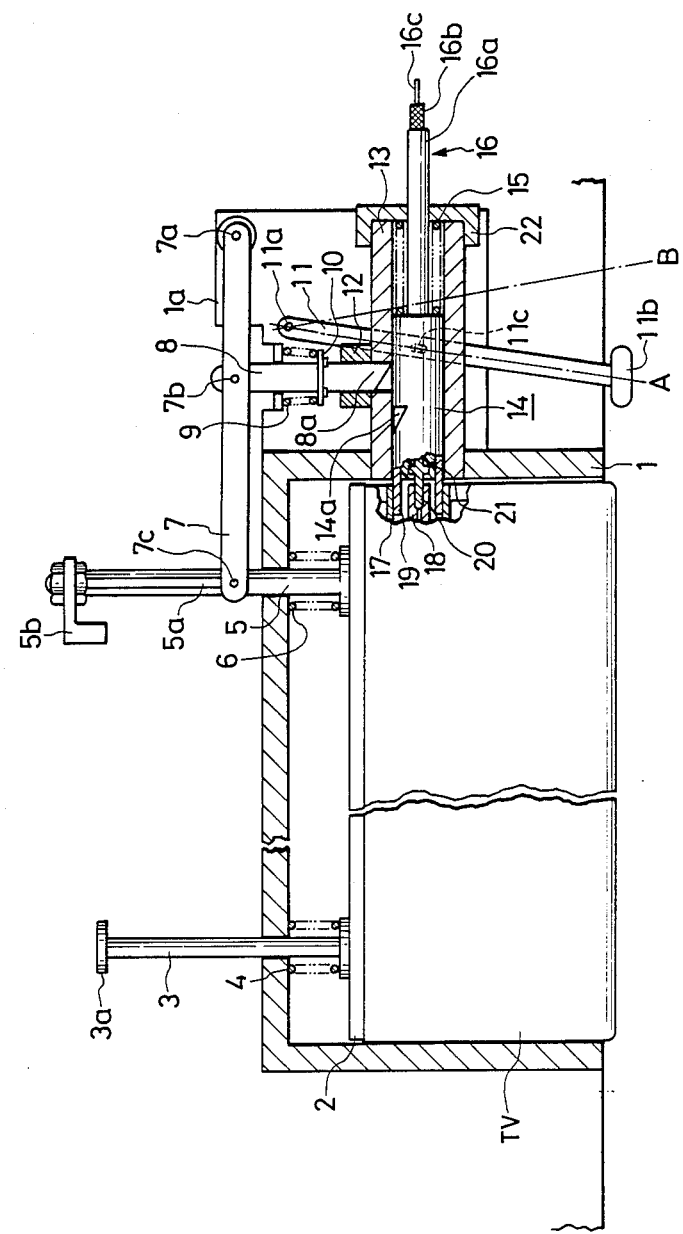
FIG. 1 is a sectional view showing the construction of the vehicle television receiver system as a first embodiment of the present invention.

FIG. 1 is a sectional view showing the construction of a first embodiment of the vehicle television receiver system according to the present invention.

In the drawing, a housing 1 is installed in a part of a vehicle, such as a console, a dashboard or the like, and has a size enough to house a television receiver TV. Accordingly, the housing 1 has a shape which can correspond to the kind of the television receiver TV, such as that having a liquid-crystal display portion, that having a CRT display portion, or the like. A movable plate 2 has double functions. That is, the movable plate 2 closes the entrance of the housing 1 when the television receiver TV is not housed in the housing 1, while it is urged to move by the back of the television receiver TV when the television receiver TV is housed in the housing 1. The movable plate 2 is provided with a plurality of movable bars 3 and 5 and springs 4 and 6, the springs 4 and 6 being interposed between the movable plate 2 and the housing 1. The springs 4 and 6 are provided with elastic force to spread the distance between the movable plate 2 and the housing 1. The motion of the movable plate 2 according to the elastic force of the springs 4 and 6 is limited by stopper portions 3a and 5b formed on the movable bars 3 and 5 respectively.

The movable bar 5 has a groove portion 5a formed longitudinally and engaged with a fitting pin 7c provided at an end of a actuator bar 7 pivotally supported by a pivot pin 7a on a substrate 1a provided on an extension of the housing 1. Accordingly, even if the movable plate 2 is moved, the motion of the movable bar 5 cannot be transmitted to the actuator bar 7 in the case where the groove portion 5a of the movable bar 5 is engaged with the fitting pin 7c of the actuator bar 7. However, when the end of the grove portion 5a of the movable bar 5 comes into contact with the fitting pin 7c of the actuator bar 7, the end of the actuator bar 7 at the fitting pin 7c side can turn round the bearing pin 7a.

A lock bar 8 is connected to the actuator bar 7 through a lock bar support pin 7b, so that the motion of the actuator bar 7 can be transmitted to the lock bar 8. The lock bar 8 has an engagement portion 8a disposed opposite to the lock bar support pin 7b and engaged with a notch portion 14a of an engagement member 14. The lock bar 8 is guided by a guide 12 so that the engagement portion 8a is engaged with the notch portion 14a of the engagement member 14. The lock bar 8 is provided with a spring 9 interposed between a spring step 10 attached to the lock bar 8 and an erected portion of the substrate 1a, so that the engagement portion 8a of the lock bar 8 is urged toward the engagement member 14 by the elastic force of the spring 9. Accordingly, the end of the engagement portion 8a of the lock bar 8 is in contact with the surface of the engagement member 14 or is engaged with the notch portion 14a thereof, and the fitting pin 7c at an end of the actuator bar 7 is located at the housing 1 side.

The engagement member 14 is fitted into a cylinder 13. At the inside of the engagement member 14, an inner conductor 16c and an outer conductor 16b of a coaxial cable 16 are electrically and mechanically connected to a connector center pin 20 and a connector outer cylinder 19, respectively, in the impedance-matched state of the coaxial cable 16. The connector center pin 20, the connector outer cylinder 19 and an insulating matter 21 therebetween make up a feeder connector for guiding electromagnetic wave, the feeder connector having a structure the same as or similar to that of a known coaxial cable connector. On the other hand, the coaxial cable 16 that is known is made up of the inner conductor 16c, the outer conductor 16b formed of braided wire, an insulating outer coat 16a, and an insulator not shown and provided between the outer conductor 16b and the inner conductor 16c.

The engagement member 14 is fitted into the cylinder 13 and a spring 15 is provided between the engagement member 14 and a cylinder stopper 22 fixed at the end of the cylinder 13, so that the engagement member 14 is urged to move toward the housing 1. The coaxial cable 16 is passed through the cylinder stopper 22 and connected at its one end to an antenna disposed at the outside of the vehicle. Because the engagement member 14 is urged toward the housing 1 and is slidable in the cylinder 13, the coaxial cable 16 having enough length to follow by the movement of the engagement member 14 is connected to the engagement member 14 and is passed through the cylinder stopper 22.

The engagement member 14 is fitted to a connection pin 11c of an release lever 11 pivotally supported by a support pin 11a. When the release lever 11 is at a point A of FIG. 1, the movement thereof is limited so that the release lever 11 functions as stopper for the engagement member 14 at the housing 1 side. When the release lever 11 is at a point B of FIG. 1, the movement thereof is also limited so that the release lever 11 functions as a stopper for the engagement member 14 and, at the same time, the engagement member 8a. of the lock bar 8 is engaged with the notch portion 14a of the engagement member 14. Accordingly, when the engagement portion 8a of the lock bar 8 and the notch portion 14a of the engagement member 14 are out of engagement, the release lever 11 is located at the point A and the feeder connector of the engagement member 14 projects toward the housing 1. When the release lever 11 is at the point B, the engagement portion 8a and the notch portion 14a of the engagement member 14 are engaged with each other and latches engagement member 14 within the cylinder 13 so that the feeder connector of the engagement member does not project into the housing 1.

A connector center pin receiver 18 and a connector outer cylinder receiver 17, which are respectively electrically and mechanically connected to the connector center pin 20 and the connector outer cylinder 19 as constituent members of the feeder connector of the engagement member 14, are provided on the television receiver TV. The connector center pin receiver 18 and the connector outer cylinder receiver 17 make up a feeder connector together with the connector center pin 20 and the connector outer cylinder 19. The connector has a structure the same as or similar to that of a known coaxial cable connector. The connector center pin receiver 18 and the connector outer cylinder receiver 17 function as a high-frequency input device of the television receiver TV, or in other words, as a television electromagnetic wave input device for signal processing.

The thus constructed vehicle television receiver system according to the first embodiment of the present invention can be used as follows.

First, the television receiver TV is fitted to the entrance of the housing 1 and then pressed into the housing 1. The movable plate 2 is pressed by the back of the television receiver TV, so that the movable bars 3 and 5 project from the housing 1 against the elastic force of the springs 4 and 6. The end of the groove portion 5a of the movable bar 5 comes into contact with the fitting pin 7c at the end of the actuator bar 7, so that the end of the actuator bar 7 at the fitting pin 7c side turns round the support pin 7a so that the motion of the actuator bar 7 is transmitted to the lock bar 8. Accordingly, the engagement portion 8a of the lock bar 8, the end of which has been engaged with the notch portion 14a of the engagement member 14, is disengaged from the notch portion 14a of the engagement member 14, so that the engagement member 14 is unlatched and projects toward the housing 1 owing to the elastic force of the spring 15. At the same time, the release lever 11 moves to the point A.

In this condition, the feeder connector, made up of the connector center pin receiver 18 and the connector outer cylinder receiver 17 in the television receiver TV, is located opposite to the feeder connector, made up of the connector center pin 20 and the connector outer cylinder 19 in the engagement member 14, so that the feeder connector of the engagement member 14 projecting toward the housing 1 owing to the elastic force of the spring 15 automatically becomes electrically and mechanically connected to the feeder connector of the television receiver TV and locks the latter in the housing unit 1.

Accordingly, if the television receiver TV having an inside electric source is installed into the housing 1, the mechanical locking connection between the feeder connector is established automatically to prevent the removal of the television receiver TV from the housing 1, and, at the same time, the electrical connection therebetween is established to permit guiding television electromagnetic wave to the television receiver TV. Thus, the television receiver TV can be housed or attached in an object in which the housing 1 can be set.

On the other hand, in the case where the television receiver TV is taken out from the housing 1, a release button 11b at the top end of the release lever 11 is moved to the point B to make the engagement portion 8a of the lock bar 8 engage with the notch portion 14a of the engagement member 14. The feeder connector, made up of the connector center pin receiver 18 and the connector outer cylinder receiver 17 in the television receiver TV, is disconnected from the feeder connector device made up of the connector center pin 20 and the connector outer cylinder 19 in the engagement member 14 and permits removal of the TV from the housing 1.

At the same time, the television receiver TV is pressed out by the movable plate 2 owing to the elastic force of the springs 4 and 6 disposed at the rear side of the movable plate 2, so that the engagement porting 8a of the lock bar 8 becomes engaged with the notch portion 14a of the engagement member 14. In this condition, the engagement member 14 is housed in the cylinder 13 so that the engagement member 14 does not project toward the housing 1. Accordingly, by removing the television receiver TV from the housing 1, the movable plate 2 is pressed to move to the entrance of the housing 1 until the movement thereof is limited by the stopper portions 3a and 5b and the movable plate 2 stops there.

Although this embodiment has shown the case where the vehicle television receiver system includes an inside electric source, the invention is applicable to the case where an on-vehicle electric source is used as an external electric source for the television receiver TV.

Figure 2:
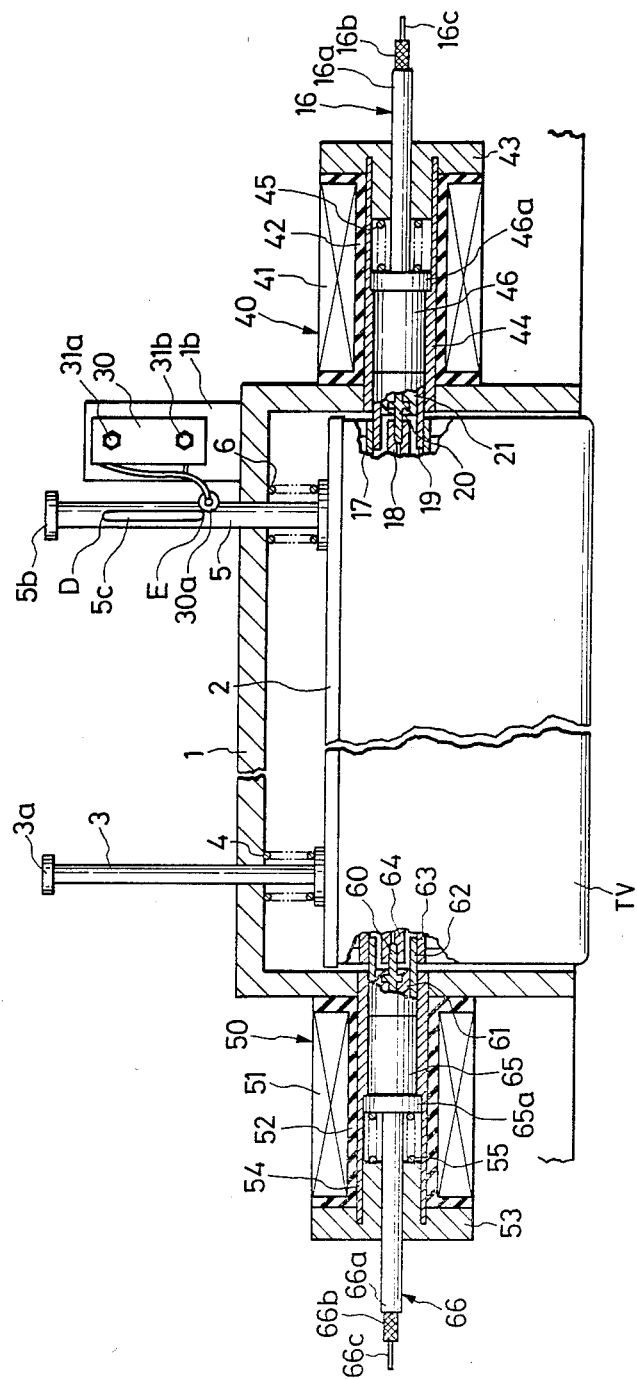
FIG. 2 is a sectional view showing the construction of the vehicle television receiver system as a second embodiment of the present invention.

FIG. 2 is a sectional view showing the construction of a second embodiment of the vehicle television receiver system according to the present invention. In FIGS. 1 and 2, like parts are identified by the same reference character or numeral. Particularly, different parts from the first embodiment will be described hereunder.

In the drawing, a convex portion 5c integrally formed on the movable bar 5 is in contact with an operation lever 30a of a microswitch 30 fixed by screws 31a and 31b to the substrate 1b integrally attached to the housing 1. An elongated hole not shown is formed in the substrate 1b to thereby change the contacting condition between the operation lever 30a of the microswitch 30 and the convex portion 5c of the movable bar 5 depending on the positions of the screws 31a and 31b of the microswitch 30. While the movable bar 5 moves so that the contact between the operation lever 30a and the convex portion 5c of the movable bar 5 is made, the microswitch 30 is operative.

An engagement member 46 is fitted into a non-magnetic sleeve 44. A spring 45 is interposed in a yoke 43 fixed to an end of the sleeve 44, so that the engagement member 46 is urged toward the housing 1. A stopper portion 46a of the engagement member 46 is in contact with a stepped portion of the sleeve 44 against the elastic force of the spring 45. In the same manner as described above for the first embodiment, the inner conductor 16c and the outer conductor 16b of the coaxial cable 16 for guiding television electromagnetic wave to the inside of the engagement member 46 are respectively electrically and mechanically connected to the connector center pin 20 and the connector outer cylinder 19 constituting a feeder connector, with taking impedance matching of the coaxial cable 16. A solenoid 40 composed of a bobbin 42 and a coil 41 wound thereon, is mounted on the sleeve 44. An end of the solenoid 40 is fixed by the yoke 43. Particularly in this embodiment, part or whole the engagement member 46 is formed of a magnetic material.

The engagement member 46 having the feeder connector makes a reciprocating motion owing to electric current supplied to the solenoid and the force of the spring 45.

Another engagement member 65 is fitted into a sleeve 54. At the inside of the engagement member 65, an inner conductor 66c of a shielded line 66 and a power connector center pin 60 are electrically and mechanically connected to each other and, at the same time, an outer conductor 66b of the shielded line 66 and a power connector outer cylinder 62 are electrically and mechanically connected to each other. The power connector center pin 60, the power connector outer cylinder 62 and an insulator disposed therebetween make up a power connector which has a structure the same as or similar to that of a known coaxial cable connector. On the other hand, the known shielded line 66 is made up of the inner conductor 66c, the outer conductor 66b formed of braided wire, an insulating outer coat 66a, and an insulator not shown and provided between the outer conductor 66b and the inner conductor 66c.

A solenoid 50 composed of a bobbin 52 and a coil 51 wound thereon, is mounted to the sleeve 54. An end of the solenoid 50 is fixed by a yoke 53. The engagement member 65 is fitted into the sleeve 54, and a spring 55 is interposed between the engagement member 65 and the yoke 53 fixed to an end of the sleeve 54, so that the engagement member 65 is urged toward the housing 1. A stopper portion 65a of the engagement member 65 is in contact with a stepped portion of the sleeve 54 against the elastic force of the spring 55. The shielded line 66 is passed through the yoke 53 and connected at its end to an electric source such as an on-vehicle battery or the like. Because the engagement member 65 is urged toward the housing 1 and is slidable in the sleeve 54, the shielded line 66 having enough length to follow the movement of the engagement member 65 is connected to the engagement member 65 and passed through the yoke 53.

A power connector center pin receiver 64 and a power connector outer cylinder receiver 63, which are respectively electrically and mechanically connected to the power connector center pin 60 and the power connector outer cylinder 62 constituting the power connector of the engagement member 65, are provided on the television receiver TV. The power connector center pin receiver 64 and the power connector outer cylinder receiver 63 make up a power connector in the same manner as described above for the power connector center pin 60 and the power connector outer cylinder 62. The power connector has a structure the same as or similar to that of a known coaxial cable connector. The power connector center pin receiver 64 and the power connector outer cylinder receiver 63 are used as a power supply for the television receiver TV.

The engagement member 65 having the power connector makes a reciprocating motion owing to electric current supplied to the solenoid 50 and the force of the spring 55.

The thus constructed vehicle television receiver system according to the second embodiment of the present invention can be used as follows First, the television receiver TV is fitted to the entrance of the housing 1 and then pressed into the housing 1. The movable plate 2 is pressed by the back of the television receiver TV, so that the movable bars 3 and 5 project from the housing 1 against the elastic force of the springs 4 and 6. Before the movable plate 2 comes in contact with the engagement members 46 and 65, the end D of the convex portion 5c of the movable bar 5 comes in contact with the operation lever 30a of the microswitch 30. In this condition, the microswitch 30 operates to excite the solenoids 40 and 50.

Accordingly, when the solenoid 40 is excited, the engagement member 46 is attracted to the yoke 43 against the elastic force of the spring 45 so that the feeder connector projecting toward the housing 1 is housed into the sleeve 44. Further, when the solenoid 50 is excited, the engagement member 65 is attracted to the yoke 53 against the elastic force of the spring 55 so that the power connector projecting toward the housing 1 is housed into the sleeve 54.

Therefore, the movable plate 2 is pressed by the back of the television receiver TV and, further, pressed into the housing 1. As the result, the movable bars 3 and 5 further project from the housing 1 against the elastic force of the springs 4 and 6. During this time, the microswitch 30 continuously operates to excite the solenoids 40 and 50.

When the contact between the convex portion 5c of the movable bar 5 and the operation lever 30a of the microswitch 30 is finished by the end E thereof, the operation of the microswitch 30 is finished so that the solenoids 40 and 50 are deenergized. As the result, the engagement member 46 which has been being attracted toward the yoke 43 against the elastic force of the spring 45, obeys the elastic force of the spring 45 so that the feeder connector thereof projects toward the housing 1.

In this condition, the feeder connector, made up of the connector center pin receiver 18 and the connector outer cylinder receiver 17 in the television receiver TV, is located opposite to the feeder connector made up of the connector center pin 20 and the connector outer cylinder 19 in the engagement member 46, so that the feeder connector of the engagement member 46 projecting toward the housing 1 owing to the elastic force of the spring 46 becomes electrically and mechanically connected to the feeder connector of the television receiver TV.

When the solenoid 50 is deenergized in the same manner as described above, the engagement member 65 which has been being attracted toward the york 53 against the elastic force of the spring 55 obeys the elastic force of the spring 55 so that the power connector thereof projects toward the housing 1.

Similarly, in this condition, the power connector made up of the power connector center pin receiver 64 and the power connector outer cylinder receiver 63 in the television receiver TV is located opposite to the power connector made up of the connector center pin 60 and the connector outer cylinder 62 in the engagement member 65, so that the power connector of the engagement member 65 projecting toward the housing 1 owing to the elastic force of the spring 55 becomes electrically and mechanically connected to the power connector of the television receiver TV.

Accordingly, if the television receiver TV is attached into the housing 1 regardless of whether the television receiver TV has an inside elastic source or not, the mechanical connection between the power connectors is established to prevent the disconnection of the television receiver TV from the housing 1 and, at the same time, the electrical connection therebetween is established to permit guiding television electromagnetic wave to the television receiver TV. Further, the mechanical connection between the feeder connectors is established to prevent the disconnection of the television receiver TV from the housing 1 and, at the same time, the electrical connection therebetween is established to permit guiding television electromagnetic wave to the television receiver TV. Consequently, the television receiver TV can be housed and attached into an object in which the housing 1 is set, and further, the television receiver TV can be used as it is.

Figure 3:
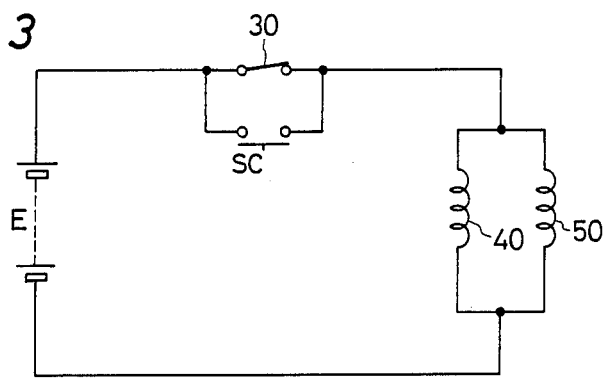
FIG. 3 is a view of a control circuit used in the vehicle television receiver system of FIG. 2.

On the other hand, in the case where the television receiver TV is to be removed from the housing 1, a release switch SC shown in FIG. 3 and connected in parallel to the microswitch 30 is turned on to excite the solenoids 40 and 50. When the solenoid 40 is excited, the engagement member 46 is attracted to the yoke 43 against the elastic force of the spring 45 so that the connection between the feeder connector devices projecting toward the housing 1 is released. At the same time, when the solenoid 50 is excited, the engagement member 64 is attracted to the yoke 53 against the elastic force of the spring 55 so that the connection between the power connectors projecting toward the housing 1 is released.

Therefore, the movable plate 2 is pressed out by the back of the television receiver TV owing to the elastic force of the springs 4 and 6, so that the television receiver can be taken out of the housing 1. Accordingly, by removing the television receiver TV from the housing 1, the movable plate 2 is pressed to move to the entrance of the housing 1 until the movement thereof is limited by the stopper portions 3a and 5b and the movable plate 2 stops there.

According to the aforementioned construction of this embodiment, television electromagnetic wave and electric power for the television receiver TV can be supplied respectively through the feeder connectors and through the power connectors, and at the same time, the television TV can be attached to the housing 1 by the feeder connectors and power connectors.

Figure 4:
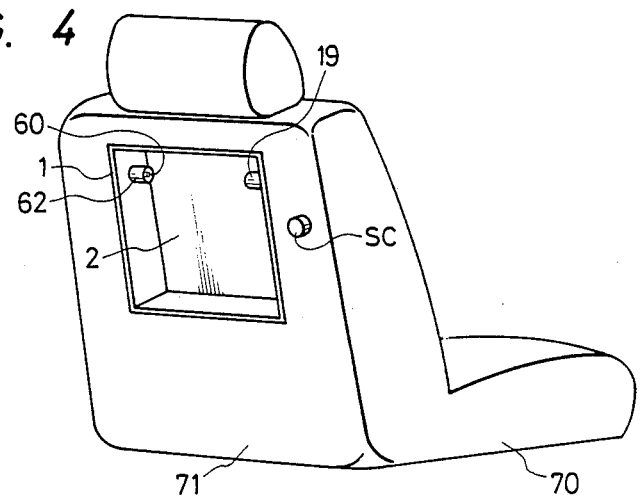
FIG. 4 is a perspective view of a seat, showing the positions of mounting members in the case where the television receiver system of FIG. 2 is established in the seat on the assumption that a television receiver will be mounted thereto.

The housing 1 in the aforementioned embodiment can be used as shown in FIG. 4 which is a perspective view showing the positions of the engagement members on the assumption that the television receiver is attached to the vehicle television receiver system of this embodiment.

Figure 5:
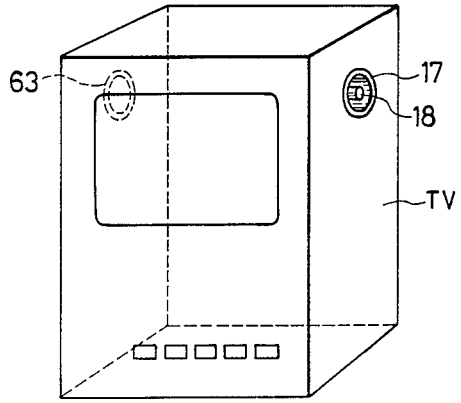
FIG. 5 is a perspective view of the television receiver used in the second embodiment of the invention.
Figure 6:
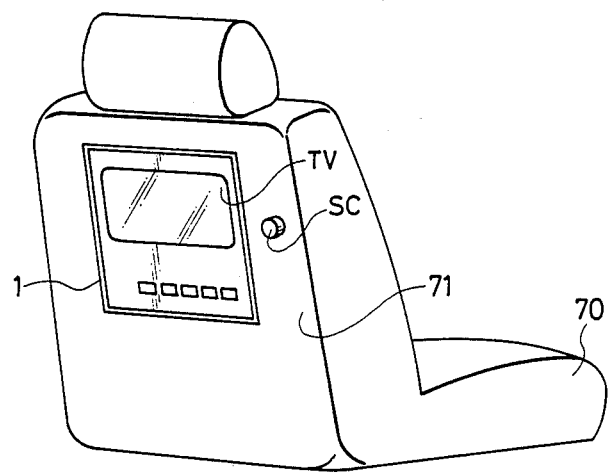
FIG. 6 is a perspective view showing the condition that the vehicle television receiver system of FIG. 2 is established in the seat and the television receiver has been mounted thereto.

In FIG. 4, an opening portion is provided in the rear surface 71 of a front seat 70, and the housing 1 of the vehicle television receiver system of the second embodiment is fixed to the opening portion. The television receiver TV used herein is formed as shown in the perspective view of FIG. 5. Accordingly, the television receiver TV is attached to the television receiver system as shown in the perspective view of FIG. 6 and, at the same time, they are electrically and mechanically connected to each other.

Although this drawing has shown the case where the housing 1 of the vehicle television receiver system of the second embodiment is fixed to the opening portion provided in the rear surface 71 of the front seat 70, it is a matter of course that the housing 1 of the vehicle television receiver system of the first embodiment may be attached thereto.

Figure 7:
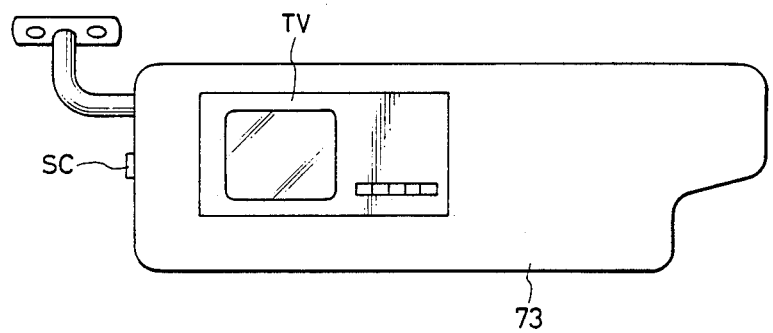
FIG. 7 is a perspective view showing the condition that the vehicle television receiver system according to the present invention is established in a sun visor and the television receiver has been mounted thereto.

Further, the vehicle television receiver system of this embodiment may be installed in a sun visor 73 as shown in FIG. 7 so that the television receiver TV can be attached thereto.

Figure 8:
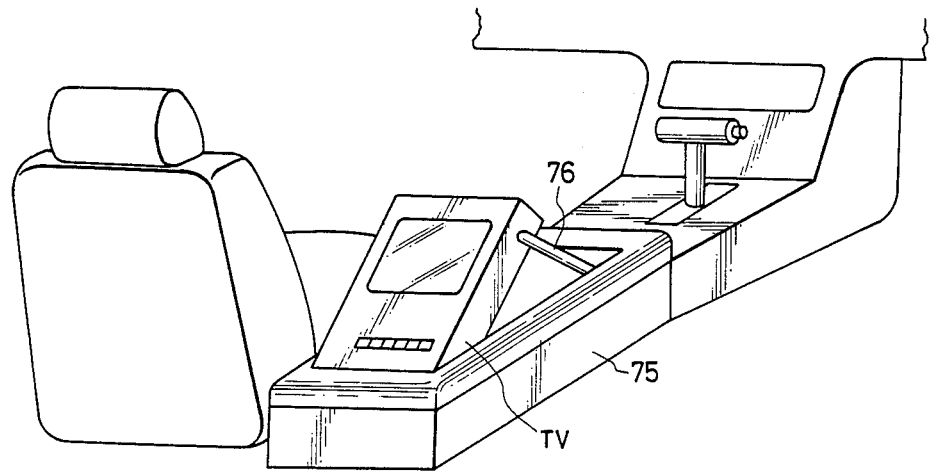
FIG. 8 is a perspective view showing the condition that the veicle television receiver system according to the present invention is established in a console and the television receiver has been mounted thereto.
Figure 9:
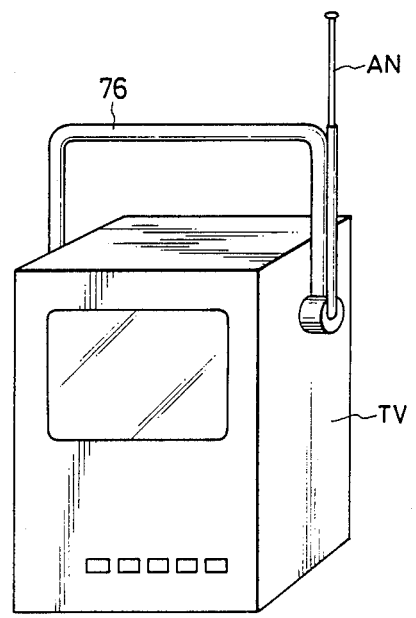
FIG. 9 is a perspective view showing the condition that the vehicle television receiver system according to the present invention is brought out of the vehicle.

Further, as shown in the perspective view of FIG. 8 showing the condition that the vehicle television receiver system of this embodiment is installed in a console and that the television receiver thereto, the housing 1 may be installed in a console 75 and the television receiver may be watched with supported by a supporting member 76 at a predetermined angle after the television receiver TV projects out of the housing 1 so as to turn round the feeder connector and power connectors which are not shown in drawing. Furthermore, the supporting member 76 used herein may be formed as a feeder connector or as a power connector. Further, as shown in FIG. 9, the supporting member 76 may be used as a stay in the case where the television receiver TV is carried out of the vehicle. FIG. 9 shows the case where an antenna AN is provided together with the supporting member 76.

As described above, according to the respective embodiments, the engaged condition of the television receiver TV can be produced by the operation of the engagement means, such as feeder connectors, power connectors and the like, installed in the vehicle to be operated by housing the television receiver TV in the housing 1 installed in a specific place of the vehicle, and on the other hand, the release condition of the television receiver TV from the lock means can be produced by operating the release means, such as a mechanical release lever 11, an electrical release switch SC and the like.

It is to be understood that the specific place of the vehicle for housing the television receiver TV is not limited to the rear portion of the seat, the console, the dashboard, the sun visor and the like, but any place such as for example the door of the vehicle can be used as long as the place is thicker than the television receiver TV. However, in the case where the engagement means such as feeder connectors, power connectors, and the like are used merely for holding the television receiver TV and the feeder connectors and/or power connectors are disposed at the back of the television receiver TV, it is unnecessary to install the housing 1 in a specific place of the vehicle, and it is possible to expose part or whole of the television receiver TV.

Although the aforementioned embodiments have shown the case where the engagement means installed in the vehicle to produce the engagement condition of the television receiver include feeder connectors and/or power connectors, the invention is applicable to the case where the engagement means do not include feeder connectors and/or power connectors. However, by using feeder connectors and/or power connectors as shown in the aforementioned embodiments, the electrical condition necessary to the television receiver can be satisfied by the engagement means, and further, good appearance of the neighborhood of the television receiver after attachment can be attained.

Although the embodiments have been described on the assumption that the television receiver has a liquid crystal display portion, it is understood that the invention is not limited to the specific television receiver having such a liquid crystal display portion, but the television receiver may have a CRT display portion. However, by using the television receiver having such a liquid crystal display portion. The degree of freedom as to the place where the television receiver is attached can be heightened.

As described above, in the vehicle television receiver system according to the present invention, the engagement means attached to a vehicle is arctuated to make a television receiver be in an engaged condition when the television receiver is housed in a specific place of the vehicle, and when the release means is operated, the engagement means and the television receiver are made to be in a released condition. Accordingly, the attachment/detachment of the television receiver can be performed by one-touch operation.

What is claimed is:

1. A vehicle television receiver installation system comprising:
    an open-front housing for attachment to a vehicle and for receiving and holding a television receiver;
    means associated with said housing for automatically locking a television receiver therein when the receiver is installed in said housing through said open-front, said locking means including connectors for supplying electric power to the receiver; and
    manually operable means for unlocking said locking means to permit removal of the receiver from said housing.

2. A vehicle television receiver installation system comprising:
    an open-front housing for attachment to a vehicle and for receiving and holding a television receiver;
    means associated with said housing for automatically locking a television receiver therein when the receiver is installed in said housing through said open-front, said locking means including connectors for supplying electromagnetic waves to the receiver; and
    manually operable means for unlocking said locking means to permit removal of the receiver from said housing.

3. A vehicle television receiver installation system comprising:
    an open-front housing for attachment to a vehicle and for receiving and holding a television receiver;
    means associated with said housing for automatically locking a television receiver therein when the receiver is installed in said housing through said open-front, said locking means including connectors for supplying electric power and connectors for supplying electromagnetic waves to the receiver; and
    manually operable means for unlocking said locking means to permit removal of the receiver from said housing.

* * * * *